United States Patent [19]

Robertson et al.

[11] 4,300,523
[45] Nov. 17, 1981

[54] BARBECUE OVEN

[76] Inventors: Berthal B. Robertson, 1413 Shawnee Dr., Apt. A; Michael L. Robertson, Rte. 6, Box 238, both of Marion, Ill. 62959

[21] Appl. No.: 34,251

[22] Filed: Apr. 30, 1979

[51] Int. Cl.³ ............................................. F24C 15/16
[52] U.S. Cl. .................................... 126/21 A; 99/474; 99/479; 126/41 B
[58] Field of Search ................. 99/479, 474, 481, 473; 126/21 R, 25 AA, 41 B, 21 A, 25 R

[56] References Cited

U.S. PATENT DOCUMENTS

| | | | |
|---|---|---|---|
| 1,952,968 | 3/1934 | Brand | 99/479 |
| 2,558,569 | 6/1951 | Koch | 126/41 B |
| 2,568,022 | 9/1951 | Parker | 99/473 |
| 2,626,559 | 1/1953 | Rau | 126/25 R |
| 2,790,380 | 4/1957 | Shryack | 99/427 |
| 2,833,201 | 5/1958 | Simank | 126/21 A |
| 3,568,590 | 3/1971 | Grice | 126/25 R |
| 3,658,047 | 4/1972 | Happel | 126/21 A |
| 3,665,840 | 5/1972 | Horany | 99/479 |
| 3,792,654 | 2/1974 | Turner | 99/481 |

FOREIGN PATENT DOCUMENTS 502388  5/1920  France ................................. 99/473

Primary Examiner—Stephen P. Garbe
Attorney, Agent, or Firm—Gravely, Lieder & Woodruff

[57] ABSTRACT

An oven that is particularly suited for preparing barbecued foods with minimal consumption of wood includes a housing that encloses an oven chamber and an apertured firebox that extends into the oven chamber from one of the housing walls. The firebox is closed by a door that is located at the exterior of the housing, and through this door firewood may be placed into the firebox. That wall of the housing which is located opposite the firebox door supports a conversion-type gas burner having a blast tube that is directed into the firebox to provide a gas flame that serves not only to ignite the wood in the firebox, but also to provide supplementary heat, if necessary. The firebox, although being in the oven chamber is shielded from the portion of the chamber in which the food is cooked by a partition wall, and that wall together with one of the housing end walls supports a rotisserie that carries the food as it is cooked. Air and smoke from the firebox are circulated and recirculated through the oven chamber by a fan. A vent extends into the bottom of the oven chamber so as to exhaust from coolest part of the oven chamber. The entire arrangement is such that the food reaches and maintains the desired cooking temperature with a minimal expenditure of wood or other fuel, yet acquires the desired barbecued taste with minimum shrinkage and weight loss.

23 Claims, 5 Drawing Figures

BARBECUE OVEN

BACKGROUND OF THE INVENTION

This invention relates in general to cooking, and more particularly to an oven for preparing barbecued foods.

Barbecued meats have traditionally been prepared over open fires, and while this procedure may be suitable for an occasional barbecue in the back yard, it is wholly inadequate for the preparation of barbecued meats on a large scale commercial basis. In the first place, open barbecue fires consume an enormous amount of fuel, which in most instances is wood or charcoal, since most of the heat from the fire merely escapes into the atmosphere without heating the meat. Also, open fires require constant attention to insure that they do not extinguish or else become too intensive. Not only do such fires require attention, but the meat must also be turned from time-to-time to insure that it cooks uniformly. As a consequence, foods cooked using conventional barbeque procedures require full time monitoring, which can in itself be expensive, considering the extended times that some barbecued meats are cooked.

Restaurants that specialize in barbecued foods have recently gained popularity, particularly in the southern states, and to meet the needs of these restaurants, commercial barbecue ovens have been developed. Some of these ovens rely solely on natural or liquid petroleum gas for fuel, and as a consequence do not provide the type of smoke that is necessary for the authentic barbecue flavor. Others are heated by electricity, and in addition to not providing adequate smoke, these ovens consume enormous amounts of power and are costly to operate. Still other ovens burn wood, but consume enormous quantities of it in order to provide the necessary heat and smoke. Indeed, some of these wood burning ovens permit the fire to become so hot that it produces a minimal amount of smoke, and this of course detracts from the quality of the barbecued meat. In fact, most of the heat and smoke produced by such ovens is lost to the atmosphere, just as is the case with open fires.

Wood suitable for barbecuing, particularly certain hardwoods such as hickory, is becoming more difficult and expensive to procure, and for that reason alone it is desirable to use the wood to its maximum benefit.

SUMMARY OF THE INVENTION

One of the principal objects of the present invention is to provide a barbecue oven which burns both a gaseous fuel and wood. Another object is to provide a barbecue oven of the type stated which derives maximum heat and smoke from the wood that it does consume. A further object is to provide a barbecue oven of the type stated that requires little attention, and can be left unattended for long periods of time. An additional object is to provide a barbecue oven of the type stated that develops heated air currents which maintain even temperatures within the meat-cooking section of the oven, yet affords maximum circulation of smoke. Still another object is to provide an oven of the type stated that exhausts the interior of the oven in a manner to maintain maximum temperature and smoke penetration. Yet another object is to provide an oven of the type stated which is highly reliable and extremely durable. An additional object is to provide an oven of the type stated which self-bastes the meat in its own natural juices. These and other objects and advantages will become apparent hereinafter.

The present invention is embodied in an oven having a housing that encloses an oven chamber and a firebox that is located within the oven chamber and has apertures for releasing heated products of combustion into the oven chamber. The invention also consists in the parts and in the arrangements and combinations of parts hereinafter described and claimed.

DESCRIPTION OF THE DRAWINGS

In the accompanying drawings which form part of the specification and wherein like numerals and letters refer to like parts wherever they occur.

DETAILED DESCRIPTION

Figure 1:
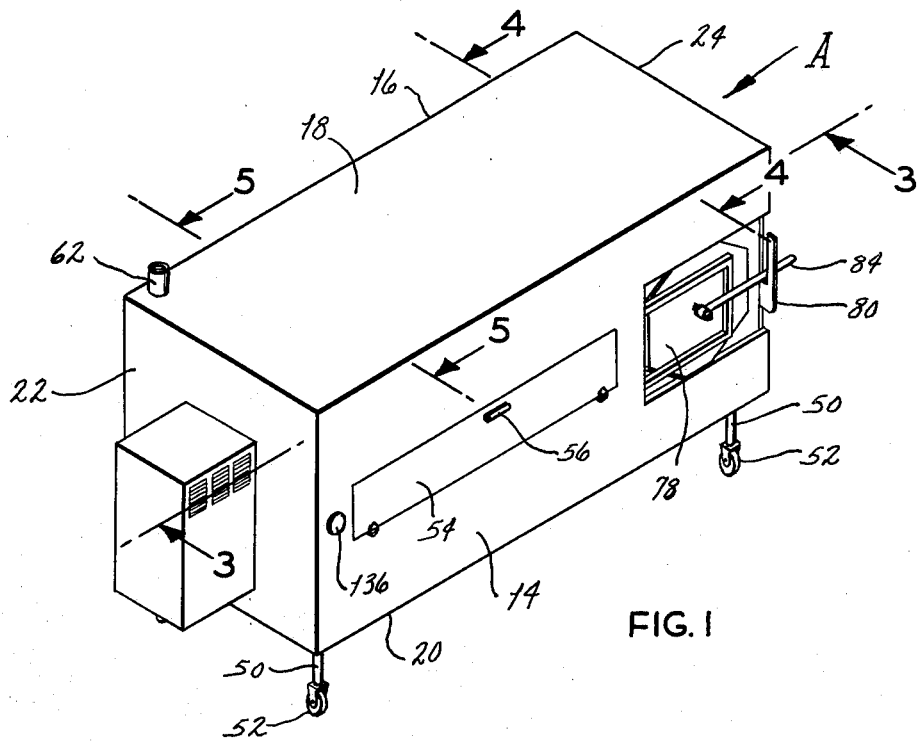
FIG. 1 is a perspective view of an oven constructed in accordance with and embodying the present invention.
Figure 2:
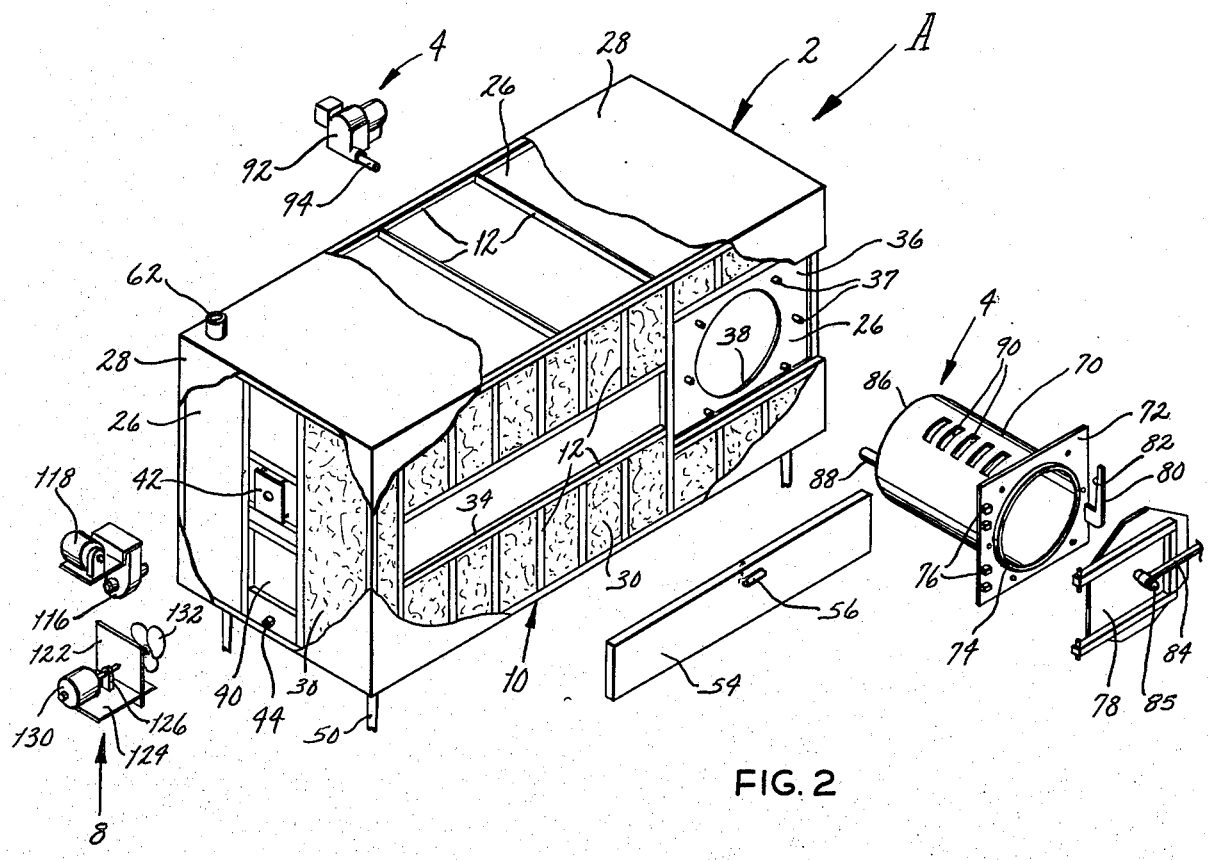
FIG. 2 is an exploded perspective view of the oven showing most of its major components detached and also showing portions of the housing shell broken away to reveal the underlying housing frame.

Referring now to the drawings (FIGS. 1 and 2), A designates an oven that is ideally suited for the barbecue cooking of various meats on a large volume basis such as at a restaurant that features barbecued foods or at a large picnic-like gathering. The oven A cooks the meat at a uniform temperature which is low enough to enable the meat to maintain much of its natural juices. The juices which do escape serve to baste the meat within the oven, thereby enhancing its flavor. In addition, the oven A is capable of generating a substantial quantity of hardwood smoke and of circulating that smoke such that it permeates the meat to the maximum extent. The oven A possesses several major components, namely a housing 2, a heating unit 4, a rotisserie 6, and an air circulating unit 8.

The housing 2 includes (FIGS. 2-5) a frame 10 composed of vertical and horizontal steel members 12, which are preferably angles, all welded together into a box-like configuration so as to provide the housing 2 with front and rear walls 14 and 16, top and bottom walls 18 and 20, and left and right end walls 22 and 24. The frame members 12 on each of the walls 14, 16, 18, 22 and 24 have stainless steel sheet fastened to their inwardly and outwardly presented surfaces such as by rivets or welding, with the inner sheet forming a liner 26 for each of the walls 14, 16, 18, 20, 22 and 24, and the outer sheet forming a shell 28 for those walls. The spaces between the liner 26 and shell 28 are filled with a suitable insulating material 30 which may be rock wool or fibered glass. The walls 14, 16, 18, 20, 22 and 24, and in particular the liners 26 on those walls, enclose an oven chamber 32 in which meat or other food is cooked.

The front wall 14 contains an elongated opening 34 (FIG. 2) of rectangular configuration, and this opening is framed with both horizontal and vertical members 12. One side of the opening 34 is located adjacent to the left end wall 22, while the other side is located next to a recess 36 in the wall 14. In effect, the shell 28 is cut away at the recess 36 to expose the liner 26. The recess 36 is framed on three sides by frame members 12 within the wall 14, and is backed with the liner 26 which has bolts 37 welded to it such that they project forwardly into the recess 36. The portion of the liner 26 that is exposed through the recess 36 is a large circular opening 38.

Near its lower end, the left end wall 22 has a rectangular aperture 40 (FIG. 2) that is framed with horizontal and vertical frame members 12 in the wall 22. Directly above the aperture 40, generally at the elevation of the elongated opening 34 in the front wall 14, the left end wall 22 is fitted with a mounting bracket 42 that is welded to the frame members 12 of the wall 22, yet is for the most part presented outwardly beyond the shell 28 of the wall 22. Immediately below the rectangular aperture 40 the wall 22 has a drain port 44 which opens into the oven chamber 32 along the liner 26 of the bottom wall 20, which is in effect the floor of the oven chamber 32.

Directly across the oven chamber 32 from the recess 36 in the front wall 14, the rear wall 16 has a small mounting plate 46 (FIG. 5) welded to its frame members 12. The plate 46 in turn has a small circular aperture 38, and likewise so does the underlying portion of the shell 28 and liner 26. The aperture 48 is somewhat lower than the center of the circular opening 38 in the mounting plate 36.

The bottom wall 20 has short legs 50 extended downwardly from it at its corners and these legs may be fitted with casters 52 to enable the oven A to be easily moved.

The elongated opening 34 in the front wall 14 is normally closed by a door 54 (FIGS. 2 and 5) which is hinged to the frame member 12 that extends along the lower margin of the opening 34. The door 54 has a handle 56 which when turned to the proper position, engages the frame member 12 that extends along the upper margin of the opening 34, permitting the door 54 to be secured in its closed position. Thus, the handle 56 when released from the upper frame member 12, will permit the door 54 to swing downwardly against the exterior shell 28 of the front wall 14 so as to provide access to the oven chamber 32.

The housing 2 further includes a baffle wall 60 (FIGS. 3 and 4) which extends from the front wall 14 to the back wall 16. Indeed, the baffle wall 60, like the other walls, contains frame members 12 and a skin, and its frame members 12 are attached firmly to the frame members 12 in the front and rear walls 14 and 16, with the attachment to the front wall 14 being in the narrow area between its elongated opening 34 and its circular opening 28. The baffle wall 60 is high enough to shield the heating unit 4 from that portion of the oven chamber 32 located opposite the door 54, yet the lower edge of the baffle wall 60 is spaced a considerable distance from the bottom wall 20, while the upper edge is spaced from the top wall 18, although to a lesser distance. This spacing permits air and smoke within the oven chamber 32 to circulate through the chamber 32, passing first under the baffle wall 60, then the heating unit 4 where its temperature rises, and finally over the baffle wall 60 into the portion of the chamber 32 in which the rotisserie 6 is located.

Completing the housing 2, is a vent stack 62 (FIGS. 3–5) which projects upwardly from the top wall 18 at that corner of the wall 18 which is located adjacent to the juncture of the rear wall 16 and the left end wall 22. Indeed, the vent stack 62 extends downwardly into the oven chamber 32 adjacent to that juncture, and terminates close to the bottom wall 20. Thus, the vent stack 62 exhausts only the air and smoke from the lowest portion of the oven chamber 32, which is normally the coolest portion of the chamber 32. However, the upper portion of the stack 62 is heated by the hotter air in the upper portion of the oven chamber 32, so the flue-effect of the stack 62 is quite pronounced.

Turning to the heating unit 4, it includes a firebox 70 (FIGS. 2–4) that is in effect a steel drum which is only slightly smaller in diameter than the circular opening 38 at the back of the recess 36. The firebox 70 is about as long as the oven chamber 32 is wide, and at its one end is welded to a flange plate 72 that is set slightly rearwardly from the front end edge of the box 70, so that the end projects beyond the plate 72 in the form of a slight lip 74. The flange plate 72 is about the same size as the recess 36 in the front wall 16 and fits directly against the shell 26 at the back of the recess 36. The bolts 37, which project from the shell 26, pass through the flange plate 72 and secure it and the firebox 70 firmly to the housing 2. To one side of the lip 74 the flange plate 72 is provided with a pair of hinges 76 to which a door 78 is connected such that it can swing between a closed position, in which it bears against the lip 74 and closes the end of the firebox 70, and an open position, in which it is away from the lip 74 so that the interior of the firebox 70 is accessible. On the other side of the lip 74 is a keeper bracket 80 that is welded to the flange plate 72 and has an upwardly opening slot 82, the forward margin of which tapers downwardly toward the flange plate 72. The door 78, on the other hand, has a handle 84 that is connected to it by means of a pivot pin 85. This enables the handle 84 to be lifted high enough to clear the keeper bracket 80 as the door 78 is closed, yet when the door 78 is completely closed and the handle 84 is released, the handle 84 will drop downwardly into the slot 82 and tightly secure the door 78 in its closed position.

The opposite end of the cylindrical firebox 70 is closed by an end plate 86 (FIG. 4) from which a short sleeve 88 projects. The sleeve 88 fits into the apertures 48 in the rear wall and the overlying mounting plate 46, and this arrangement serves to position the rear end of the firebox 70 in the housing 2. The cylindrical wall of the firebox 70 is solid, except for a series of relatively large vent apertures 90 (FIGS. 2 and 3) that extend from the top center of that wall for about 45° toward the baffle wall 60.

In addition to the firebox 70, the heating unit 4 includes a burner 92 that is mounted on the small mounting plate 46 of the rear wall 16 and has a blast tube 94 which projects into the sleeve 88 that extends from the end plate 86 of the firebox 70. The burner 92 may be a conventional conversion burner of the type used to convert coal- and oil-fired furnaces to gas furnaces. When in operation, the burner 92 introduces a combustible mixture of air and gas into the firebox 70 where the mixture ignites to produce a flame within the firebox 70.

Figure 5:
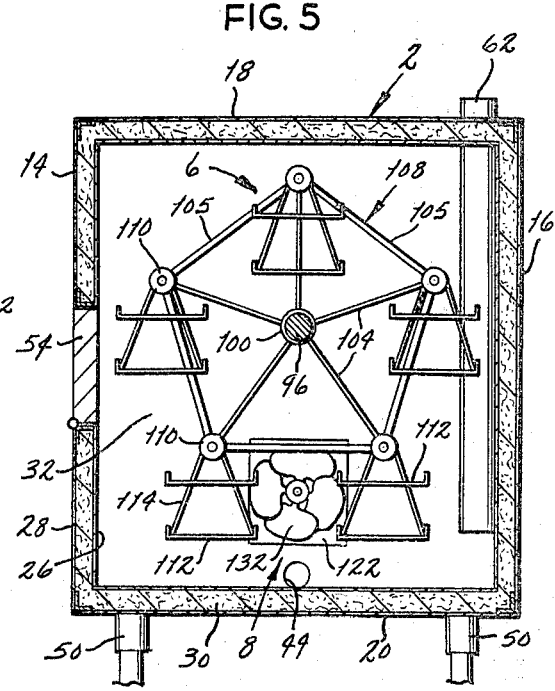
FIG. 5 is a sectional view taken along line 5—5 of FIG. 1 and showing the rotisserie in section.

Referring now to the rotisserie 6, it includes (FIGS. 3 and 4) a circular axle 96 which extends through the oven chamber 32 from the baffle wall 60 to the left end wall 22, with one end of the axle 96 being received in a bearing 98 located on the baffle wall 60 and the other end being received in another bearing 98 that is on the end wall 22. Within the oven chamber 32, the axle 96 is fitted with hubs 100 having spokes 104 radiating thereform, and the spokes 104 at their ends are connected by tie rods 105 to form end frames 108 of pentagonal or some other polygonal shape. At the ends of the spokes 104 the frames 108 have trunnions 110 which project toward one another and these trunnions support cooking trays 112. In other words, the trunnions 110 are arranged in pairs which align with each other, and each pair of trunnions 110 supports a separate cooking tray 112 that is capable of holding meat as it is being cooked. Moreover, the trays 112 are small enough to fit through the opening 34 in the front wall 14, and are at their ends provided with triangular brackets 114 which merely loop over the trunnions 110 so that they can be easily detached from the trunnions 110 to enable the trays 112 to be detached and removed from the oven chamber 32. The trays 112 should be fabricated from stainless steel or some other non-toxic metal, and their bottom surfaces, that is the surfaces on which the meat rests, should possess a grid pattern to permit maximum exposure of the meat to smoke and heat and to further permit juices to drip from the meat. These bottom surfaces are preferably arranged in two levels for each tray 112 to afford maximum capacity (FIG. 5).

Figure 3:
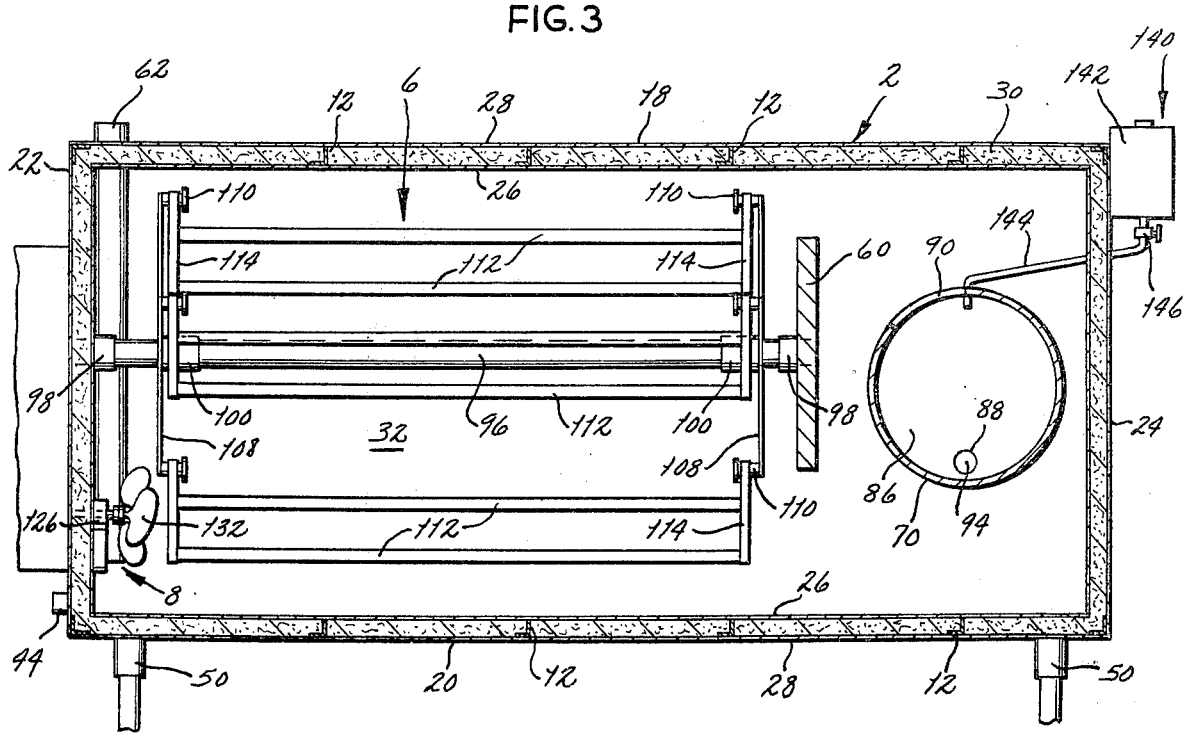
FIG. 3 is a longitudinal sectional view taken along line 3—3 of FIG. 1 and showing the rotisserie of the oven.
Figure 4:
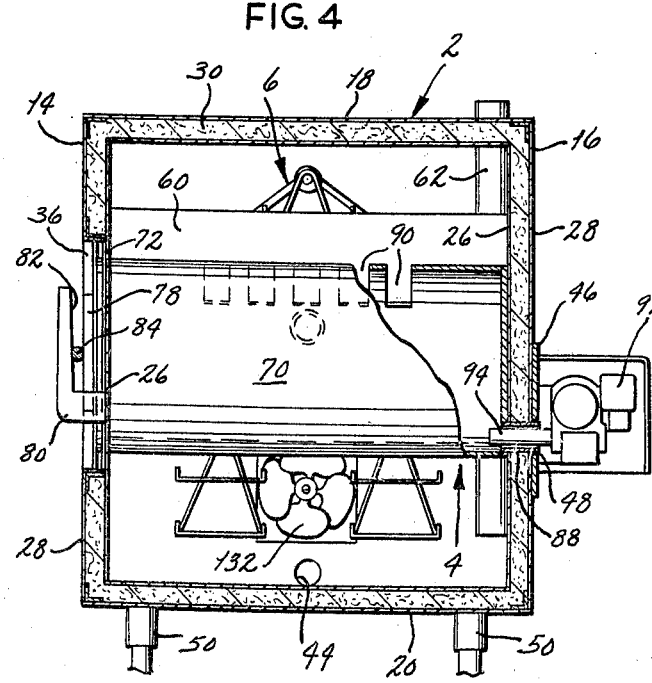
FIG. 4 is a sectional view taken along line 4—4 of FIG. 1 and showing the firebox and burner for directing a flame into it.

The axle 96 does not terminate at the left end wall 22, but instead projects completely through it and also through the mounting bracket 42 that is located beyond it (FIG. 3). The mounting bracket 42 supports a right angle gear box 116 (FIG. 2), the output shaft of which is coupled to the axle 96. The input shaft for the gear box 116 is driven by an electric motor 118 which is also mounted on the bracket 42. The speed ratio of the gear box 116 is such that the motor 118 will rotate the axle 96 at about $\frac{3}{4}$ rev/min. As the axle 96 revolves, the trays 112 are carried around in a circular path within the oven chamber 32, and this path passes close to the elongated opening 34 in the front wall 14 (FIG. 5). This enables the trays 112 to be loaded through that opening 34.

With regard to the air circulating unit 8, it consists of (FIG. 2) a vertical plate 122 that is bolted against the frame members 12 which surround the rectangular aperture 40 in the lower portion of the left end wall 22. The vertical plate 122 has a base plate 124 projected from it in both directions, and the base plate 124 supports pillow blocks 126 through which a fan shaft 128 passes. The base plate 124 further supports and electric motor 130 that is coupled to the fan shaft 128 through a universal coupling. The fan shaft 128 extends parallel to the axle 96 of the rotisserie 6 and to the bottom wall 20 of the housing 2 as well, and at its end is fitted with a fan blade 132. Being positioned within the lower portion of the oven chamber 32 (FIG. 3 and 5), the fan blade 132, when rotated by the motor 130, drives air and smoke along the bottom wall 20 of the housing 2 and thereby sets up a circulation pattern within the oven chamber 32. That pattern is such that the air flows along the bottom wall 20 and beneath the baffle wall 60, thence upwardly past the heating unit A, then generally horizontally over the upper edge of the baffle wall 60 and along the underside of the top wall 18, and finally downwardly over the rotisserie 6 to the bottom wall 20.

The gas burner 92 is controlled by a thermostat 136 (FIG. 1) which senses the temperature within the oven chamber 32 generally in the vicinity of the uppermost tray 112 on the rotisserie 6. When the temperature drops below a prescribed value, the thermostat 136 energizes the gas burner 92 which continues to burn until the temperature within the oven chamber 32 is elevated to another prescribed temperature. Usually about a 7° F. spread exists between the two temperatures.

OPERATION

To operate the oven A, the firebox 70 is first loaded with a suitable combustible, such a wood. This is a simple matter involving merely releasing the door 78, opening it, and placing one or two logs in the firebox 70. The door 78 is then closed and secured in its closed position by allowing the handle 84 to drop downwardly into the upwardly opening slot 82 of the keeper bracket 80. In addition, the door 54 in the front wall is opened and meat is placed on the trays 112 of the rotisserie 6. Since the trays 112 pass directly by the opening 34 in the front wall 14, the motor 118 for the rotisserie 6 is energized just long enough to bring an empty tray 112 to the opening 34. This tray is then loaded through the opening 34, and the motor 118 is again energized to bring another tray 112 to the opening 34. The remaining trays 112 are loaded in this manner.

Once the trays 112 are loaded, the door 54 is swung upwardly and secured in its closed position by the handle 56. Then, the motor 118 for the rotisserie 6 and the motor 130 for the air circulating unit 8 are energized. The operator selects the temperature at which he desires to cook the meat and sets the thermostat at that temperature. This causes the gas burner 92 to ignite and direct a flame into the firebox 70 where the flame impinges against the logs and ignites them. The burning logs, in turn, supply additional heat and emit considerable smoke which escapes through the series of vent apertures 90 in the firebox 70. The smoke then becomes entrained in the airstream induced by the fan blade 132 of the circulating unit 8.

The airstream which circulates through the oven chamber 32 passes from the vicinity of the fan blade 132 along the bottom wall 20 of the housing 4 and under the baffle wall 60, beyond which it rises around the firebox 70 of the heating unit 4. Here the airstream acquires considerable heat and smoke as well. The heated smoke-filled air thereupon passes over the baffle wall 60 and along the underside of the top wall 18, again entering the vicinity of the rotisserie 6. Here the airstream descends over the meat on the trays 112, heating that meat sufficiently to cook it. The airstream is laden with a considerable amount of smoke which penetrates the meat, imparting a desirable smoked flavor to it. After descending past the rotisserie 6, the air is again impelled by the fan blade 132 along the lower wall 20, thus repeating the cycle. Since the airstream is repeatedly circulated through the chamber 32, little heat is wasted, and the same is true of the smoke. In other words the heated and smoke-filled air is utilized to maximum advantage, and this of course reduces the fuel demands.

After a short period of operation, the logs will burn with sufficient intensity to supply all of the heat that is necessary to maintain the oven chamber 32 at the desired temperature. Once this temperature is reached, the thermostat 136 de-energizes the burner 92. Normally, the desired cooking temperature is maintained merely with the heat supplied from logs that are in the firebox 70. However, should the temperature within the firebox 70 drop to the minimum temperature for the thermostat 136, the thermostat 136 will again ignite the burner 92 to supply sufficient heat to again bring the temperature of the oven chamber 32 up to the desired cooking temperature. Logs are easily introduced into the firebox 70 as the meat continues to cook, this involving nothing more than opening the door 78 and placing a log or two in the firebox 70.

The vent stack 62 vents the interior of the oven chamber 32 to the atmosphere to permit more air to be introduced for supporting combustion within the firebox 70. Since the lower end of the vent stack 62 is located adjacent to the bottom wall 20 of the housing 2, only the coolest air in the oven chamber 32 is exhausted to the atmosphere. This enhances the efficiency of the oven A and permits the firebox 70 to operate at temperatures much lower than those at which conventional barbecue ovens operate. In this same vein, the fact that the firebox 70 is within the oven chamber 32 assures that practically all heat produced in the firebox 70 is transferred to the air in the oven chamber 32. In effect, a large proportion of the heat is transferred to the meat through the circulating air and this improves the efficiency of the oven A substantially, permitting it to operate on less fuel and at lower temperatures than conventional ovens.

The trays 112 of the rotisserie 6 move above and below each other when the rotisserie 6 is in operation, and as a consequence the natural meat juices from the upper trays 112 drop onto the meat of the lower trays 112. To this extent the meat is self-basting, and in any event considerably less basting sauce is used than with conventional ovens.

Since the vent stack 62 opens into the oven chamber 32 at the bottom of the chamber 32, only the coolest air is exhausted from the chamber 32. This improves the efficiency of the oven A significantly. Furthermore, the vent stack 62 passes directly through the oven chamber 32 where its upper regions are heated by the hot air within the chamber 32. This enhances the flue-effect, enabling the oven to draw quite well and provide the firebox 70 with a continuous supply of fresh air to support combustion of the wood within it.

Since the firebox 70 is the hottest part of the oven, it usually fails before the remaining structural components. However, a defective firebox 70 is easily remedied, merely by removing the nuts from the bolts 37, pulling the defective firebox 70 and its flange plate 72 from the housing 2, and then installing a new firebox 70 and flange plate 72 in its place.

To enhance the flavor of the barbecued meat still further, the oven A may be provided with a grease dripper 140 including a grease tank 142 that is mounted on the right end wall 24 and a discharge pipe 144 that leads from the bottom of the tank 142 into the top of the firebox 70. The pipe 144 contains a valve 146 for controlling the rate at which grease flows through the pipe.

Grease which collects on the bottom wall 20 of the housing 2 may be withdrawn through the drain port 44 and poured into the grease tank 142 where it remains in a liquid state, since the tank 142 is located directly against the end wall 24 of the housing 2. This grease flows through the pipe 144 and into the firebox 70 where it drops onto the burning logs and produces even more smoke.

In lieu of supporting the meat on the rotisserie 6, the meat may be supported on fixed shelves within the oven chamber 32. In this case, a somewhat larger door 54 should be utilized so as to provide access to all of the shelves.

This invention is intended to cover all changes and modifications of the example of the invention herein chosen for purposes of the disclosure which do not constitute departures from the spirit and scope of the invention.

What is claimed is:

1. An oven that is particularly suited for preparing barbecued foods, said oven comprising: a housing including a plurality of walls, among them end walls, which enclose an oven chamber and a partition wall within the oven chamber, at least one of the walls having an opening through which food can be introduced into the oven chamber; a tubular firebox having spaced apart ends with one of the ends being closed by an end wall, the firebox having a tube extended from it with the tube having a cross-sectional area substantially smaller than the cross-sectional area of the firebox itself, the firebox being mounted on at least one of the walls and extended into the oven chamber from that wall so that it is for the most part spaced from the oven walls and exposed on its top, bottom, and sides to the oven chamber but has its tube extended to one of the oven walls, the firebox having apertures that open into the oven chamber to permit products of combustion to escape into the oven chamber; a door closing the other end of the firebox and being accessible from the exterior of the housing so that wood may be introduced into the firebox; a gas burner mounted on the housing and being directed into the tube on the firebox for producing a flame that is capable of entering the interior of the firebox for igniting wood in the firebox and for supplying supplemental heat to the oven chamber; means for supporting food in the oven chamber, said means being supported on one of the housing end walls and also on the partition wall; and means for circulating air and products of combustion from the firebox through the oven chamber such that the air and products of combustion pass by the firebox where they are heated.

2. An oven suited for preparing barbecued foods, said oven comprising: a housing including a plurality of walls which enclose an oven chamber; at least one of the walls having an opening through which food can be introduced into the oven chamber; a generally tubular firebox mounted on at least one of the walls and extended into the oven chamber from that wall so that it is for the most part spaced from the housing walls and exposed on its top, bottom, and sides to the oven chamber, the firebox having apertures that open into the oven chamber to permit products of combustion to escape into the oven chamber; a door closing one end of the firebox and being accessible from the exterior of the housing so that wood may be introduced into the firebox; means for supporting food in the oven chamber; a baffle wall between the firebox and the means for supporting food, the baffle wall being generally upright and spaced from the top and bottom surfaces of the oven chamber; and means for circulating air and products of combustion from the firebox through the oven chamber such that the air and products of combustion pass under the baffle wall, then by the firebox where they are heated, and then over the baffle wall into the region of the oven chamber in which the means for supporting food is located.

3. An oven according to claim 2 and further comprising a burner supported by the housing and directed into the firebox for igniting solid fuel in the firebox and for supplying supplemental heat to the oven chamber.

4. An oven according to claim 2 and further comprising a vent on the housing for venting the oven chamber, the vent extending through the oven chamber and opening into the oven chamber near the bottom thereof in the region of the means for supporting food.

5. An oven according to claim 2 wherein the apertures in the firebox open generally upwardly, but are offset to the baffle wall.

6. An oven for preparing barbecued foods, said oven comprising: a housing that encloses an oven chamber; horizontal trays within the oven chamber for supporting food; and a generally tubular firebox mounted on the housing for containing a fire, the firebox projecting a substantial distance into the housing from one of the housing walls so as to be located generally directly beyond the trays, the firebox being exposed to the oven chamber along both of its sides and also along its top and its bottom and being positioned within the oven chamber such that air in the oven chamber can easily circulate across the sides, top and bottom of the firebox, whereby heat from the firebox is transferred to the air within the oven chamber at all of those areas, the firebox further having apertures which open out of it into the oven chamber to permit smoke to escape from the interior of the firebox into the oven chamber, the fire that is contained within the firebox constituting the sole source of heat for heating the oven chamber.

7. An oven according to claim 6 wherein the firebox is located within the oven chamber at generally the same height as the trays.

8. An oven according to claim 6 and further comprising an upright baffle wall located between the trays and the firebox, but being spaced from the firebox, the baffle wall also being spaced from those housing walls that define the upper and lower surfaces of the oven chamber so that air may flow past the baffle wall to and from the firebox.

9. An oven according to claim 8 and further comprising a fan on the housing for circulating air that is within the housing in a path that extends below the baffle wall, below the firebox, along the sides of the firebox, over the firebox, and over the baffle wall.

10. An oven according to claim 6 and further comprising a flame-producing burner mounted on the housing and being directed into the firebox such that the flame it produces will impinge against a solid fuel placed in the firebox.

11. An oven according to claim 6 wherein the housing has a side wall and the firebox is secured to the side wall such that upon being detached from the side wall it can be withdrawn through the side wall, whereby the firebox is easily replaced.

12. An oven according to claim 6 and further comprising a vent stack mounted on the housing and extended into the oven chamber where the vent stack is exposed to the oven chamber, the vent stack opening into the oven chamber near the bottom thereof so that the oven chamber is vented from its lower regions.

13. An oven according to claim 6 and further comprising a flange plate on the end of the firebox and being secured to the housing such that it can be easily detached, and a door mounted on the flange plate and capable of moving between a closed position, wherein it closes the end of the firebox, and an open position, wherein the interior of the firebox is accessible.

14. An oven that is particularly suited for preparing barbecued foods, said oven comprising: a housing including a plurality of walls which enclose an oven chamber, there being front and rear walls and top and bottom walls, at least one of the housing walls having an opening through which food can be introduced into the oven chamber, the housing also having a partition wall which extends between the front and rear walls, but is spaced from the top and bottom walls; a tubular firebox having spaced apart ends with one of the ends being closed by an end wall having a tube extended from it, the firebox being mounted on at least one of the walls and being extended into the oven chamber from that wall such that it extends generally between the front and rear walls and is for the most part spaced from the housing walls, including the top and bottom walls, so as to be exposed on its top, bottom, and sides to the oven chamber, the firebox having apertures that open into the oven chamber to permit products of combustion to escape into the oven chamber; a door closing the other end of the firebox and being accessible from the exterior of the housing so that wood may be introduced into the firebox; a gas burner mounted on the housing and being directed into the tube on the firebox for producing a flame that is capable of igniting wood in the firebox and supplying supplemental heat to the oven chamber; means for supporting food in the oven chamber, with such means being shielded from the firebox by the partition wall; and means for circulating air and products of combustion from the firebox through the oven chamber such that the air and products of combustion pass under the partition wall, then past the firebox where they are heated, then over the partition wall, and then past the food on the means for supporting the food.

15. An oven according to claim 14 wherein the housing further includes end walls located at and connected to the ends of the front and rear and the ends of the top and bottom walls and the means for supporting the food is in turn supported on one of the end walls and the partition wall.

16. An oven according to claim 15 wherein the means for circulating air and products of combustion is a fan which is located on that end wall on which the means for supporting the food is located and is further adjacent to the bottom wall, the fan being oriented to direct the air and products of combustion along the bottom wall.

17. An oven according to claim 14 wherein the means for supporting the food is a rotisserie that revolves about an axis which is generally parallel to the front and rear walls.

18. An oven that is particularly suited for preparing barbecued foods, said oven comprising: a housing including a plurality of walls which enclose an oven chamber, at least one of the walls having an opening through which food can be introduced into the oven chamber; a tubular firebox mounted on at least one of the walls and extended into the oven chamber from that wall for containing a fire that serves as the only source of heat for the oven chamber, the firebox being positioned such that it is for the most part spaced from the oven walls and exposed on its top, bottom and sides to the oven chamber, the firebox having spaced apart ends and apertures that open into the oven chamber to permit products of combustion to escape into the oven chamber; a door closing one end of the firebox and being accessible from the exterior of the housing so that wood may be introduced into the firebox; a gas burner mounted on the housing and directed into the firebox for producing a flame that is directed such that it will impinge against wood in the firebox to ignite the wood and for supplying supplemental heat to the oven chamber; means for supporting food in the oven chamber; and means for circulating air and products of combustion from the firebox through the oven chamber such that the air and products of combustion pass beneath the firebox, to the sides of the firebox, and over the firebox, whereby they are heated.

19. An oven according to claim 18 wherein the means for supporting food comprises a rotisserie for supporting foods as they are cooked in the oven chamber and for moving such foods as they are in the chamber.

20. An oven according to claim 19 wherein the firebox is located at about the same elevation as the rotisserie and is beyond the end of the rotisserie.

21. An oven according to claim 18 wherein the burner is directed into the other end of the firebox.

22. An oven according to claim 18 wherein the apertures in the firebox face generally upwardly, but are offset slightly from the top center of the firebox with the offset being toward the portion of the oven chamber where the food is cooked.

23. An oven according to claim 18 and further comprising a baffle wall located between the means for supporting food and the firebox; and wherein the means for circulating air and products of combustion causes the air and products of combustion to pass under the baffle wall, past the firebox, and then over the baffle wall.

* * * * *

REEXAMINATION CERTIFICATE (399th)
United States Patent [19]
Robertson et al.

[11] B1 4,300,523
[45] Certificate Issued  Oct. 8, 1985

[54] BARBECUE OVEN

[75] Inventors: Berthal B. Robertson; Michael L. Robertson, both of Marion, Ill.

[73] Assignee: B. B. Robertson Co., Marion, Ill.

Reexamination Request:
No. 90/000,638, Sep. 24, 1984

Reexamination Certificate for:
Patent No.: 4,300,523
Issued: Nov. 17, 1981
Appl. No.: 34,251
Filed: Apr. 30, 1979

[51] Int. Cl.⁴ .............................................. F24C 15/16
[52] U.S. Cl. ................................ 126/21 A; 126/41 B; 99/474; 99/479
[58] Field of Search ............... 126/21 R, 21 A, 25 R, 126/41 R, 41 A, 41 B, 41 C, 41 D, 41 E, 19 R; 99/473, 474, 479, 481

[56] References Cited

U.S. PATENT DOCUMENTS

| | | |
|---|---|---|
| 38,423 | 5/1863 | Shear . |
| 928,695 | 7/1909 | Pinegar ................. 99/474 |
| 1,402,204 | 3/1922 | Alsop ................. 99/478 |
| 1,602,650 | 12/1926 | Cooke . |
| 1,964,372 | 6/1934 | Tygart . |
| 2,715,870 | 8/1955 | Rutkowski ............. 99/446 |
| 2,722,882 | 11/1955 | Wilson ................. 99/421 |
| 2,737,943 | 3/1956 | Nagel ................. 126/1 |
| 2,789,877 | 4/1957 | Pfundt ................. 312/312 |
| 3,041,959 | 7/1962 | Oyler ................. 99/260 |
| 3,199,436 | 8/1965 | Rasmussen ............. 99/479 |
| 3,223,022 | 12/1965 | Powell ............. 99/473 X |
| 3,266,409 | 8/1966 | Oyler ................. 99/259 |
| 3,295,434 | 1/1967 | Wilhelm ............. 99/427 |
| 3,316,831 | 5/1967 | Koland ............. 99/479 |
| 3,333,526 | 8/1967 | Kirkpatrick ......... 99/260 |
| 3,397,632 | 8/1968 | Moler ................. 99/259 |
| 3,491,678 | 1/1970 | Oyler ................. 99/259 |
| 3,498,211 | 3/1970 | Atkins ................. 99/443 |
| 3,524,403 | 8/1970 | Treloar ............. 99/331 |
| 3,583,307 | 6/1971 | Lee ................. 99/259 |
| 3,614,923 | 10/1971 | Thompson ........... 99/427 |
| 3,788,301 | 1/1974 | Terry ................. 126/59.5 |
| 3,789,824 | 2/1974 | Mason ............... 126/59.5 |
| 3,841,211 | 10/1974 | Ellis ................. 99/482 |
| 3,882,767 | 5/1975 | Oyler et al. ......... 99/339 |
| 3,951,052 | 4/1976 | Ringo ................. 99/427 |
| 3,974,760 | 8/1976 | Ellis ................. 99/482 |

*Primary Examiner*—Margaret A. Focarino

[57] ABSTRACT

An oven that is particularly suited for preparing barbecued foods with minimal consumption of wood includes a housing that encloses an oven chamber and an apertured firebox that extends into the oven chamber from one of the housing walls. The firebox is closed by a door that is located at the exterior of the housing, and through this door firewood may be placed into the firebox. That wall of the housing which is located opposite the firebox door supports a conversion-type gas burner having a blast tube that is directed into the firebox to provide a gas flame that serves not only to ignite the wood in the firebox, but also to provide supplementary heat, if necessary. The firebox, although being in the oven chamber is shielded from the portion of the chamber in which the food is cooked by a partition wall, and that wall together with one of the housing end walls supports a rotisserie that carries the food as it is cooked. Air and smoke from the firebox are circulated and recirculated through the oven chamber by a fan. A vent extends into the bottom of the oven chamber so as to exhaust from coolest part of the oven chamber. The entire arrangement is such that the food reaches and maintains the desired cooking temperature with a minimal expenditure of wood or other fuel, yet acquires the desired barbecued taste with minimum shrinkage and weight loss.

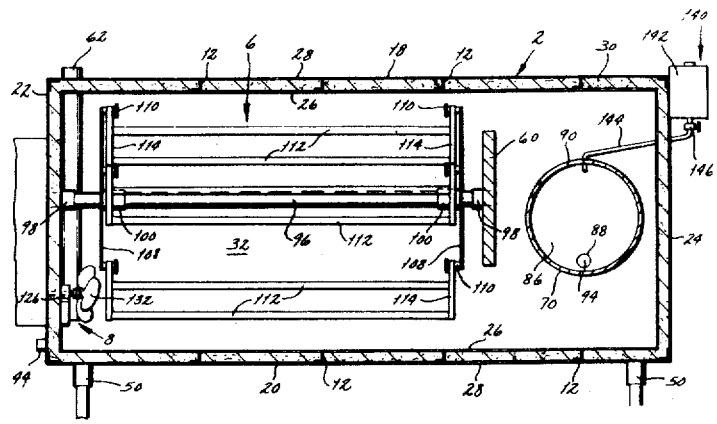

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-23 is confirmed.

* * * * *